United States Patent
Brown et al.

(10) Patent No.: US 9,982,681 B2
(45) Date of Patent: May 29, 2018

(54) EXTERNALLY PROGRAMMABLE FAN (71) Applicant: GENTHERM AUTOMOTIVE SYSTEMS (CHINA) LTD., Langfang (CN)

(72) Inventors: Fred A. Brown, Coronado, CA (US); Kenneth Hoffman, Mesa, AZ (US)

(73) Assignee: Gentherm Automotive Systems (China) LTD., Langfang, Hebi Prov. (CN)

( * ) Notice: Subject to any disclaimer, the term of this patent is extended or adjusted under 35 U.S.C. 154(b) by 334 days.

(21) Appl. No.: 14/298,075

(22) Filed: Jun. 6, 2014

(65) Prior Publication Data
US 2015/0104311 A1 Apr. 16, 2015

Related U.S. Application Data (60) Provisional application No. 61/938,873, filed on Feb. 12, 2014, provisional application No. 61/889,208, filed on Oct. 10, 2013.

(51) Int. Cl.
*F01D 19/00* (2006.01)
*F04D 27/00* (2006.01)
(Continued)

(52) U.S. Cl.
CPC ......... *F04D 27/007* (2013.01); *F04D 19/002* (2013.01); *F04D 25/08* (2013.01); *G05D 23/24* (2013.01); *H02P 23/0077* (2013.01)

(58) Field of Classification Search
CPC .... F04D 27/007; F04D 27/004; F04D 27/006; F04D 27/008; F04D 19/002;
(Continued)

(56) References Cited

U.S. PATENT DOCUMENTS 6,431,910 B1 * 8/2002 Chuang ................ F04D 29/601
415/220
6,439,658 B1 * 8/2002 Ganz ................ B60H 1/00285
297/180.14
(Continued)

FOREIGN PATENT DOCUMENTS

CN 202404420 U 8/2012
WO 01/76057 A2 10/2001
(Continued)

OTHER PUBLICATIONS

ISR Written Opinion for Application No. PCT/US2014/041281 dated May 27, 2015.

*Primary Examiner* — Logan Kraft
*Assistant Examiner* — Jason Fountain
(74) *Attorney, Agent, or Firm* — The Dobrusin Law Firm, P.C.; Daniel P. Aleksynas (57) ABSTRACT

A fan comprising: (a) an impeller, (b) a motor connected to the impeller so that during operation the motor drives the impeller to move a fluid; (c) an instrumentation assembly that includes one or more components for controlling one or more operations of the fan; (d) an interface in communication with the instrumentation assembly; wherein the interface is configured so that one or more programs, one or more signals, or both can be input into the fan after a final assembly of the fan so that the fan can be configured to perform a desired function at the time of installation into a final product, reconfigured for a different purpose than originally programmed, or both.

14 Claims, 4 Drawing Sheets

(51) Int. Cl.
  *F04D 19/00* (2006.01)
  *F04D 25/08* (2006.01)
  *H02P 23/00* (2016.01)
  *G05D 23/24* (2006.01)

(58) Field of Classification Search
  CPC ...... F04D 19/005; F04D 25/068; F04D 25/06;
  F04D 25/08; F04D 29/083; F04D 29/086;
  G05B 2219/00; G05B 1/00; G06F 1/206;
  H02K 5/04; H05K 7/20; H02P 6/22;
  H02P 6/08; H02P 6/00
  See application file for complete search history.

(56) References Cited

U.S. PATENT DOCUMENTS

| | | | |
|---|---|---|---|
| 6,509,704 B1 | 1/2003 | Brown | |
| 6,768,279 B1 * | 7/2004 | Skinner | H02P 23/0077 318/400.12 |
| 7,473,074 B2 * | 1/2009 | Herbst | F04D 29/023 415/116 |
| 7,839,033 B2 * | 11/2010 | Fujii | H02K 5/225 310/68 R |
| 8,330,586 B2 | 12/2012 | Krishnamoorthy et al. | |
| 2002/0120367 A1 | 8/2002 | Emberty et al. | |
| 2003/0234630 A1 * | 12/2003 | Blake | F04D 27/004 318/471 |
| 2003/0236594 A1 | 12/2003 | Frankel et al. | |
| 2004/0190246 A1 | 9/2004 | Arbogast et al. | |
| 2005/0106046 A1 * | 5/2005 | Winkler | H02K 29/08 417/423.3 |
| 2008/0004755 A1 | 1/2008 | Dunstan et al. | |
| 2009/0304199 A1 | 12/2009 | DeMoss | |
| 2010/0064895 A1 * | 3/2010 | Thurin | F24F 3/1603 96/222 |
| 2010/0114379 A1 | 5/2010 | Sato et al. | |
| 2010/0215509 A1 | 8/2010 | Krishnamoorthy et al. | |
| 2012/0134792 A1 * | 5/2012 | Wu | F04D 25/0613 415/198.1 |
| 2014/0163812 A1 * | 6/2014 | Randerath | B64F 5/0045 701/32.9 |
| 2015/0285266 A1 * | 10/2015 | Kienzler | F04D 19/002 415/213.1 |

FOREIGN PATENT DOCUMENTS

| | | |
|---|---|---|
| WO | 2008/002948 A1 | 1/2008 |
| WO | 2012/128850 A1 | 9/2012 |

* cited by examiner

EXTERNALLY PROGRAMMABLE FAN

FIELD

The present teachings generally relate to devices and methods for programming a fan after the fan is fully assembled and before the fan is in an installed position and/or reprogramming an existing fan that is fully assembled and installed.

BACKGROUND

Generally, fans and/or blowers are programmed during the manufacturing process and/or are installed with pre-programmed memories and/or controllers. Thus, each fan is programmed with a predetermined program or programs to perform one or more predetermined functions. A user desiring a set of functions either has to use a fan with programs that are not necessarily configured for the users particular need or the user has to request and/or special order a fan with the requisite predetermined functions. Currently, manufactures manufacture a plurality of different fans with different configurations to accommodate individual users needs so that the users particular needs are met. However, due to the large number of fans that manufacturers produce, lead times for some fans may be increased, inventory for fans may be low, or both leading to long waiting times for some fans. Further, some fans include external controllers and/or processors that control the fan during operation such that additional wiring and packaging space is needed to mount and install both the fan and the external controller and/or processor.

Examples of fans and methods may be disclosed in U.S. Pat. No. 8,330,586 and U.S. Patent Application Publication Nos. 2003/0236594; 2008/0004755; and 2009/0304199; and International Patent Application No. WO2008002948 all of which are expressly incorporated herein by reference for all purposes. It would be attractive to have a fan that includes one or more access ports for reconfiguring the fan. What is needed is fan that includes a reprogrammable memory so that the fan can be reconfigured to meet specific user needs. What is needed is a method for programming a fan to perform a desired function. What is needed is a fan that includes an interface for programming and/or reprogramming the fan while maintaining electrically sealed characteristic, water sealing characteristics, or both of the fan.

SUMMARY

The teachings herein surprisingly solve one or more of these problems by providing a fan comprising: (a) an impeller, (b) a motor connected to the impeller so that during operation the motor drives the impeller to move a fluid; (c) an instrumentation assembly that includes one or more components for controlling one or more operations of the fan; (d) an interface in communication with the instrumentation assembly; wherein the interface is configured so that one or more programs, one or more signals, or both can be input into the fan after a final assembly of the fan so that the fan can be configured to perform a desired function at the time of installation into a final product, reconfigured for a different purpose than originally programmed, or both.

Another possible embodiment of the teachings herein provides a method comprising: (a) assembling a fan comprising: (i) an impeller, (ii) a motor, (iii) an instrumentation assembly, and (iv) an interface; (b) completing assembly of the fan and packaging the fan; (c) connecting a programming device to the completely assembled fan via the interface and programming the fan, reprogramming the fan, or both.

The present teachings provide a fan that includes one or more access ports for reconfiguring the fan. The present teachings provide a fan that includes a reprogrammable memory so that the fan can be reconfigured to meet specific user needs. The present teachings provide a method for programming a fan to perform a desired function. The present teachings provide a fan that includes an interface for programming and/or reprogramming the fan while maintaining electrically sealed characteristic, water sealing characteristics, or both of the fan.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present teachings are related to U.S. Provisional Application Ser. No. 61/889,208 filed Oct. 10, 2013 and 61/938,873 filed Feb. 12, 2014, the contents of which are incorporated by reference herein.

The present teachings may be used with any fan, blower, similar device that moves air, or a combination thereof. As discussed herein fan and blower are used interchangeably and the use of the term fan is intended to encompass a blower or any other device that moves a fluid, or a combination thereof. The fan may be located in any device that requires air movement, cooling, heating, removal of humidity, or a combination thereof. The fan may be located in a computer, server room, cooling panel, electrical instrumentation, a sealed box, a vehicle, a vehicle seat, or a combination thereof. The fan may be located in one or more components of a vehicle. The fan may be located in a seat, a door panel, a trunk, or a combination thereof. Preferably, the fan may be attached to, located under, or both the bun of a seat, in the back of a seat, or both. Preferably, the fan may be connected to a vehicle battery. Preferably, the fan may be any fan that may be used in a vehicle to move a fluid through a vehicle seat. More preferably, the fan may be a low profile fan. The fan may further include a low profile, low profile componentry, or both and additional aspects of the fan profile can be gleaned from the teachings herein including those of Column 1; lines 17-67 and Column 5, lines 56 through Column 6, line 11 of U.S. Pat. No. 6,509,704, incorporated by reference herein.

The present teachings are predicated upon providing a fan (i.e., a blower) that includes a housing, an impeller or blade, a motor, and instrumentation assembly. The motor may be any motor that may be used to rotate a blade and/or impeller. The impeller and/or blade may be any device that moves air when rotated by the motor. The instrumentation assembly may be any device that houses one or more components that controls the motor, the impeller, the blade, or a combination thereof. The instrumentation assembly may include one or more printed circuit boards, one or more memories, one or more microprocessors, one or more thermistors, one or more sensors (i.e. back electromotive force sensors (BEMF), hall sensors, or both), a thermal control circuit, a speed control circuit, alarm or tach output, fan speed version (e.g., B, K, Z, or U), or a combination thereof. Each fan may include its own control system so that when multiple fan are used in a system the fans provide redundant control, each fan may be programmed differently, the fans may be programmed to work in unison, the fans may be programmed to function at different times, or a combination thereof. The fan may further include diodes, light emitting diodes, reverse polarity diodes, zener diodes, resistors, positive temperature coefficient resistors, negative temperature coefficient resistors, a high resistant resistor, a low resistant resistor, capacitors, a thermistor, a motor soft starter, or a combination thereof. Preferably, the instrumentation assembly includes at least a microprocessor and memory.

The microprocessor, the memory, or both may be any device that stores one or more operating conditions, operating modes, programs, speed versions, failure outputs, temperature control, speed control, restart control, start control, shutdown control, safety functions, or a combination thereof and preferably a plurality of programs for controlling operation of the fan. The microprocessor may include memory, the memory may be discrete from the microprocessor, or both. The memory may be any memory that is writeable, rewriteable, partially rewriteable, permanent, or a combination thereof. The memory may have a rewriteable portion, a writeable portion, a locked portion, a permanent portion, or a combination thereof. The memory may have a core portion that cannot be changed (e.g., a portion that relates to safety controls of the device). The memory may be a one part memory that is divided into a writeable and/or rewriteable portion and a permanent portion; two discrete memories with one memory being permanent and one memory being rewriteable and/or writeable; or a combination of both. Preferably, the memory may be flash memory. The memory may be located within the microprocessor and the memory may include memory that controls one or more functions of the microprocessor, the fan, or both.

The microprocessor may be any microprocessor that executes one or more functions and/or programs and preferably a plurality of functions and/or programs that are loaded into the microprocessor, memory, or both. The microprocessor may control virtually any function of the fan. The microprocessor may control one or more of speed of an impeller, speed of a blade, alarm failure threshold, temperature versus flow, volume of flow per unit time (e.g., cubic feet per minute), safety functions, power saving operations, stand by modes, stand by verses temperature, performance settings, start up, soft start, auto restart, auto shutdown, control method of the fan, or a combination thereof. The microprocessor may work in conjunction with one or more of the components located within the fan, one or more components located within the instrumentation assembly, one or more components connected to a printed circuit board, one or more of the components discussed herein, or a combination thereof. Preferably, the microprocessor works with, controls, changes output conditions, a temperature sensor, thermal control circuit, speed control circuit, alarm or tach output, or a combination thereof, based upon feedback from one or more of a thermistor, a sensor, a diode, a reverse polarity diode, a positive temperature resistor, a negative temperature resistor, a hall effect sensor, or a combination thereof. The microprocessor may be located within or be in communication with the instrumentation assembly and associated componentry.

The fan, instrumentation assembly, or both may further include one or more reverse polarity protection diodes. The reverse polarity protection diode may protect the fan, the microprocessor, or both in the event of being hooked up backwards. The fan may include one or more zener diodes. The zener diodes may be installed so that the voltage potential being applied is compatible with the working voltage of the microprocessor. The zener diode may step down the voltage to any voltage that is compatible with operating the fan, microprocessor, or both.

The fan, instrumentation assembly, or both may include one or more negative temperature coefficient (NTC) resistors. The negative coefficient resistors may function to control speed of the fan, operating conditions of the fan, may turn off a fan, or a combination thereof based upon a measured temperature. The negative coefficient resistors may provide feedback to the microprocessor and the microprocessor may execute a program based upon feedback received from the negative coefficient resistors. The negative coefficient resistors may decrease in resistance as temperature increases so that the fan control is regulated in response to the ambient temperature (i.e., increase in resistance as the temperature decreases). The resistance of a negative coefficient resistor may be compared to another resistor and/or a look up table, and the difference in resistance may be compared by the microprocessor to decide whether to turn the fan on or off. The fan may include one or more high resistance resistors, one or more low resistance resistors, or both that step up voltage, step down voltage, provide a constant voltage, or a combination thereof. The fan may include one or more temperature sensors, one or more thermistors, or both. Preferably, the fan includes at least a thermal control circuit and a speed control circuit.

The thermal control circuit may function to control the temperature of the fan, temperature of surroundings, or both. The thermal control circuit may monitor temperature of the surrounding. The thermal control circuit may include one or more thermistors. The thermistor may be any thermistor that measures a temperature. The thermistor may be any thermistor that measures an ambient temperature. The thermistor may be located at any location in or on the fan so that the thermistor measures the ambient temperature around the fan, the temperature of the fan, or both. The thermistor may provide a temperature signal to the microprocessor. The thermistor may provide feedback, an output signal, or both to the microprocessor, a speed control circuit, or both and the microprocessor, speed control circuit, or both may execute a program based upon feedback received from the thermistor. One example of a thermistor may be a negative temperature coefficient resistor as discussed herein. The microprocessor may turn the fan on or off based upon a temperature signal from the thermistor. The microprocessor may receive a signal from the thermistor. The signal from the thermistor may be an electrical signal that may be converted by the microprocessor to a corresponding temperature, which the microprocessor uses to control the blower. The microprocessor may use a look up table to convert the signal to a corresponding temperature. The look up table may be any look up table that may be installed into the fan through an interface. The look up table may be any look up table that may be installed into a fully manufactured fan so that the fan when operating in view of the look up table performs a set of functions that are predetermined by the look up table. The look up table may function to control one or more process conditions of the fan based upon an output signal. The microprocessor, speed control circuit, or both may use a look up table to determine whether the ambient temperature is high or low enough to turn the fan on, off, increase fan speed, decrease fan speed, or a combination thereof. The microprocessor, the speed control circuit, or both may monitor the temperature setting of the fan to determine a temperature set point.

The speed control circuit may function to increase or decrease a fan speed, control a temperature of the fan, control a temperature proximate to the fan, or a combination thereof. The speed control circuit may control an individual fan, a plurality of fan, or both. The speed control circuit may control a plurality of fans so that the fans work together to achieve a predetermined condition (e.g., below a maximum temperature). The speed control circuit may control each fan individual so that if one of the plurality of fans shuts down, is turned off, fails to start, fails to restart, breaks, or a combination thereof each individual fan will continue to operate. The speed control circuit may vary based upon a predetermined fan speed (RPM), fan air flow (CFM, CMM), rated air pressure (in $H_2O$, mm Hg), or a combination thereof. The speed control circuit may be programmed based upon a desired speed version (e.g., the maximum volume of air to be moved or static air pressure). The speed control circuit may maintain a constant performance over a 2 to 1 input supply range. The speed control circuit may function to increase or decrease the speed of the fan, the impeller, or both based upon a measured condition. The speed of the fan may be controlled by any device and/or method that increases and/or decreases the speed of the fan based upon a sensed condition. The speed of the fan may be varied using a variable frequency drive, pulse width modulation, or both. The speed control circuit may be a discrete circuit. The speed control circuit may be part of the microprocessor, the controller, or both.

The microprocessor, instrumentation assembly, memory, or a combination thereof may be connected to an interface. The interface may be may be any device that extend from an external location of the fan into communication with the microprocessor, instrumentation, memory, or a combination thereof so that one or more signals, one or more programs, one or more commands, or a combination thereof may be programmed into the microprocessor, instrumentation assembly, memory, or a combination thereof for controlling the fan once the fan is installed into a working product. The interface may be any interface that supports the transmission of electrical signals, data, power, or a combination thereof. The interface assembly may function to allow programming of a fan post manufacturing, post installation, or both. The interface may be configured so that one or more programs, one or more signals, or both may be input into a fan after final assembly through the interface. The interface may be a male connector or a female connector. The interface may be a standard wire, a high speed wire, a LAN wire, an ethernet cable. HDMI cable, a usb cable, usb port, a terminal wire, a phone wire, a wire with 2 or more prongs, a wire with 5 or more prongs, a fiber optic cable, or a combination thereof. Preferably, the interface is a serial port interface. The serial port interface may include about 2 connection points or more, about 3 connection points or more, about 4 connections points or more, or about 5 connection points or more. The serial port interface may extend from the fan, be statically located within the fan, or both.

The interface may be stored and/or sealed in any configuration so that the fan may be completely sealed, pass a predetermined specification, be resistant to fluid penetration, or a combination thereof. The storage may be any device that opens to provide access to the interface, provide the interface to extend out of the fan, or a combination of both. The storage may be sealed, include a seal, include a seal for sealing the interface, or a combination thereof. The fan, the storage, the interface or a combination thereof may be sealed so that water, a fluid, or both are prevented from entering, penetrating, or both the respective device. The storage may assist in maintaining the sealed characteristics of the fan. The storage may seal the interface so that the interface, storage or both and fan are UL507, edition 9, edition date Dec. 13, 1999, certified and preferably UL507wet, edition 9, edition date Dec. 13, 1999, certified. The storage may seal the interface when not in use and may allow access to one or more complementary devices so that one or more programs, algorithms, or both may be input into the fan.

The inputs into the fan may be any input that controls one or more functions of the fan. The one or more inputs may be software that functions to affect performance of the fan. The one or more inputs may be software that controls one or more outputs, varies based upon one or more process variables, or both. The software may be one or more of the inputs discussed herein. The inputs may function to control temperature, speed, an output, a speed/flow/pressure performance level of the fan, a control methodology, or a combination thereof. The inputs may be a program, an algorithm, a control routine, a decision tree, a look up table, or a combination thereof. The one or more inputs may function to change power consumption demands, noise, thermal outputs of the fan, or a combination thereof. The inputs may function to control one or more components of the fan. For example, the input may change settings of a motor soft starter such as a speed limit, supply rating, or both. The one or more inputs may change a duration of auto restarting a fan. The inputs may be any command for the microprocessor that affects one or more conditions of the fan, one or more outputs of the fan, or both. The inputs may be virtually any function of the fan that the microprocessor controls. The inputs into the fan that may be varied are one or more of: speed of an impeller, speed of a blade, alarm failure threshold, temperature versus flow, volume of flow per unit time (e.g., cubic feet per minute), safety functions, power saving operations, stand by modes, stand by verses temperature, performance settings, control method, program speed, auto restart, auto shutdown, soft start, pulse width modulation speed control, tach output, failure output, temperature control, or a combination thereof. The inputs may change the speed control input of a pulse width modulation controller. The inputs may change the switching rate, the switching frequency, the load, or a combination thereof. The inputs may provided to the fan at any time such as after assembly of the fan is complete, the fan is sealed, the fan is installed or a combination thereof. The inputs may be provided at a location outside of the assembly facility, a repair facility, a fan manufacturing facility, or both. For example, a code may be written and/or selected from a list of programs and input into the fan so that the fan is controlled. For example, a disk that is input into a laptop may be provided with the fan and a user may load the disk onto the laptop and customize a program and then connect the laptop to the fan via the interface so that the customized program is installed onto a fan. The input may be downloaded from a website, provided by a website, or both. The programming of the fan may be permanently changed so that the fan only executes that customized program. The fan may be reprogrammed one or more times for continued customization of the fan. The fan may operate while the cover is open, while the interface is connected to a programming device, or both. Preferably, the fan will not operate when the fan is connected to a programming device.

The programming device may be any device that provides data, programs, algorithms, look up tables, control routines, decision trees, or a combination thereof to a fan. The programming device may be a hand held device. The programming device may be any device with a user interface so that a user can customize a program and input the customized program into the fan. The programming device may be any device that a fan customization program may be loaded for customizing a fan. The programming device may be a computer, a laptop computer, a tablet, a smart phone, the like, or a combination thereof. The programming device may include one or more cables for connecting to the fan so that a customized program may be uploaded and then the cable may be disconnected from the fan. The programming device may be used in one or more steps of programming.

The method of programming may include connecting a fan of the teachings herein to a programming device of the teachings herein. The fan may be removed from a box and/or packaging. The fan includes an interface that may be directly connected to the programming device and/or the programming device may be plugged into the interface. A cover of the interface may be opened, closed, moved, or a combination thereof to provide access to a fan and/or seal or reseal a portion of a fan. A program may be used to customize a program. The program may have one or more predetermined questions or preferably a plurality of predetermined questions for creating a customized program for customizing a fan. The customized program and/or programming of the customized program may include selecting and/or inputting desired settings for one or more of the following: inputting control one or more of: speed of the impeller, speed of a blade, alarm failure threshold, temperature versus flow, volume of flow per unit time, safety functions, power saving operations, stand by modes, stand by verses temperature, performance settings, or a combination thereof. An existing program, a standard program, or both may be removed from the fan. The method may include a step of changing the control methodology of the fan. The method may include a step of changing from voltage control to pulse width modulation control, from voltage control to thermal control, from pulse width modulation control to thermal control, thermal control to pulse width modulation and/or voltage control, or a combination thereof. The method may include a step of controlling based upon one or more input variables and subsequently changing to a different input variable. The method may include a step of using a standard fan speed and subsequently changing fan control to control based upon one or more inputs, monitored conditions, or both. The method may include a step of reconfiguring the program speed, control method, output signal, or a combination thereof of the fan. The method may include a step of reconfiguring the fan based upon a program speed, control method, output signal, or a combination thereof. The method may include a step of moving a fan to a new location and reprogramming the fan based upon the requirements of the new location.

Figure 1:
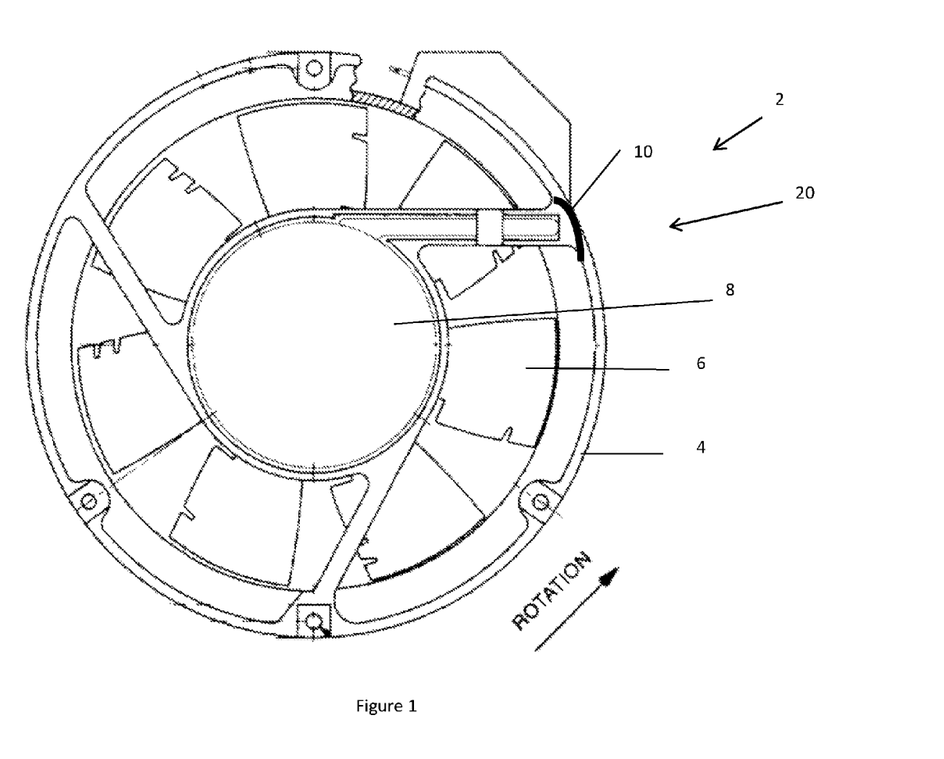
FIG. 1 illustrates a top view of a fan including an access port.

FIG. 1 illustrates and example of a fan 2. The fan 2 includes a housing 4 with a cover 10, an impeller 6, and motor 8 connected to the impeller 6.

Figure 2:
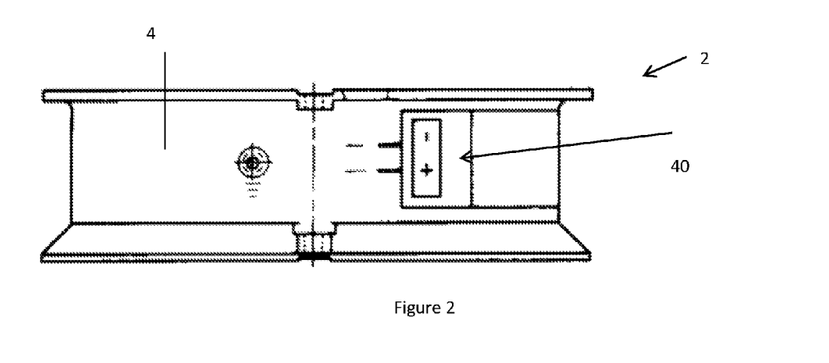
FIG. 2 illustrates a side view of a fan.

FIG. 2 illustrates the fan 2 and housing 4 with a power connector 40 extending into the housing 4.

Figure 3:
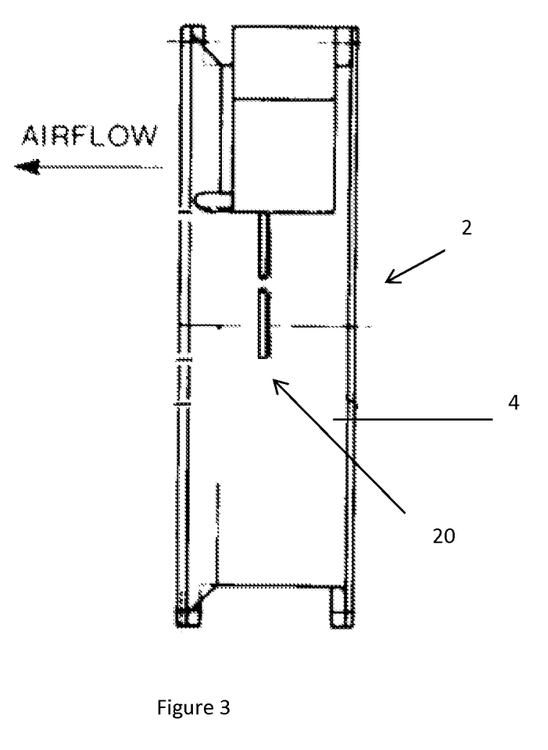
FIG. 3 illustrates another side view of a fan including an access port.

FIG. 3 illustrates a side view of the fan 2 and housing 4 with the interface 20 exposed.

Figure 4:
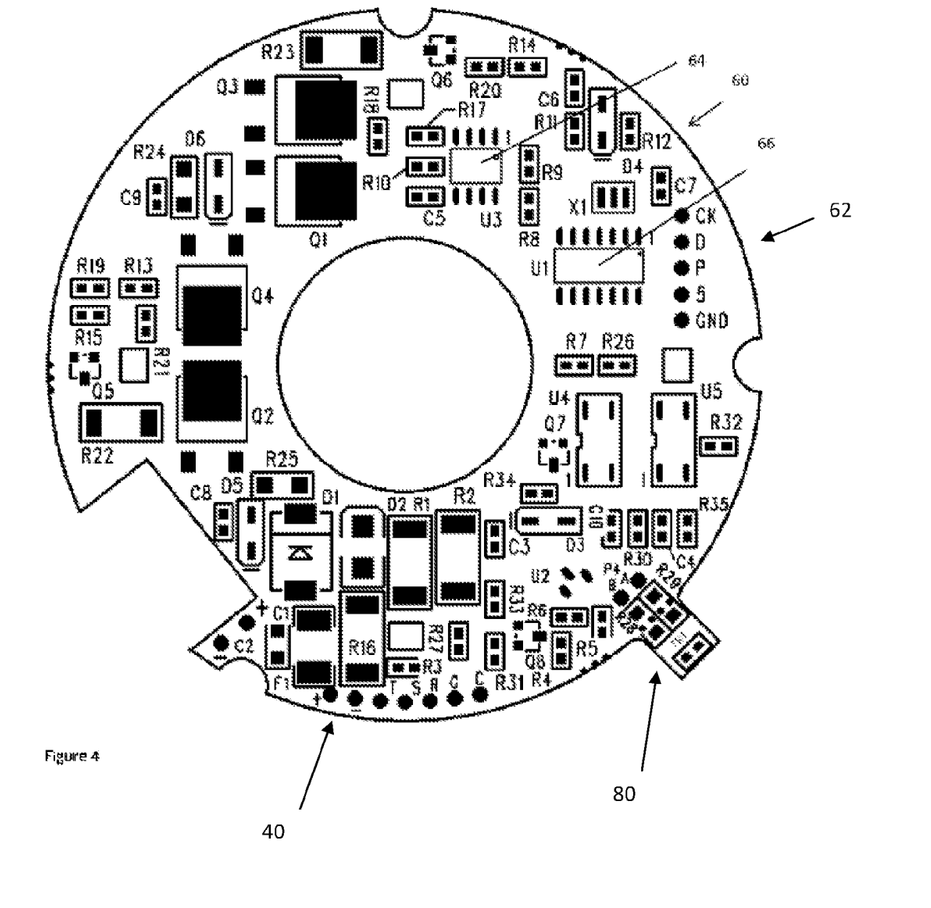
FIG. 4 illustrates one possible circuit board and associated circuitry.

FIG. 4 illustrates a printed circuit board 60 including a printed circuit board interface 62 extending there from for electrical connection to the components of the printed circuit board 62. The printed circuit board 60 includes memory 64, a thermistor 80, a power connector 40, and a microprocessor 66.

Figure 5:
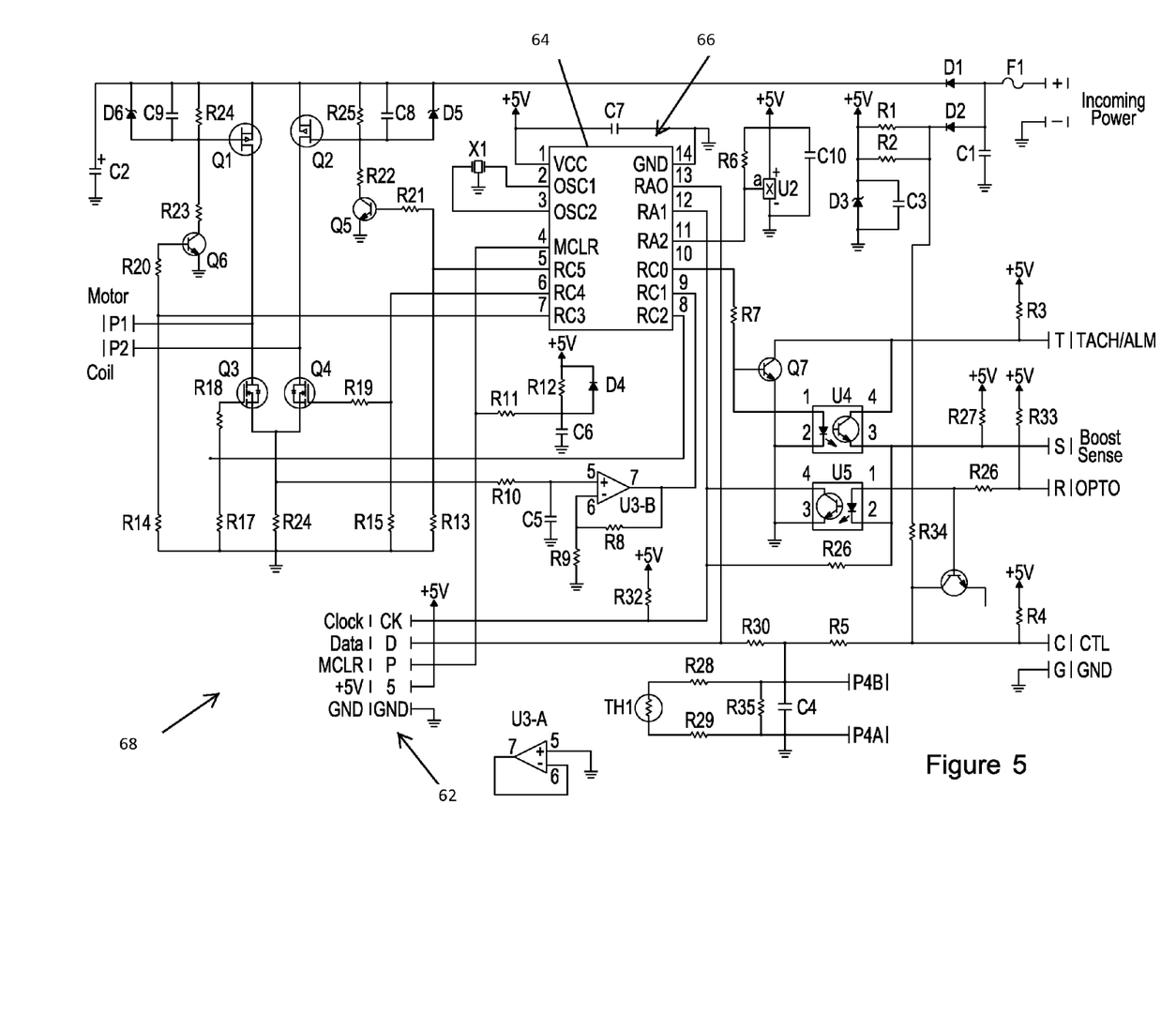
FIG. 5 illustrates a circuit diagram of circuitry of a fan including an access port.

FIG. 5 illustrates a fan circuit diagram 68 with the printed circuit board interface 62 connected to the microprocessor 66. The microprocessor 66 includes memory 64 for storing programs (not shown).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

We claim:

1. A method comprising:
   a. assembling a fan comprising:
      i. an impeller,
      ii. a motor,
      iii. an instrumentation assembly including:
         1. one or more printed circuit boards;
         2. memory connected to the one or more printed circuit boards;
         3. a microprocessor connected to the one or more printed circuit boards;
         4. a thermal control circuit, a speed control circuit, or both;
      iv. an interface in communication with the memory, the microprocessor, or both;
      v. a housing that receives the impeller, the motor, the instrumentation assembly, and the interface; and
      vi. a power connector that extends into the housing, wherein the power connector and the interface are spaced apart;
   b. completing assembly of the fan and packaging the fan;
   c. connecting a programming device to the completely assembled fan via the interface and programming the fan, reprogramming the fan, or both;
   d. directly inputting one or more programs, one or more signals, or both directly into the memory, the microprocessor, or both through the interface; and
   e. controlling the fan based upon one or more measured conditions of the thermal control circuit, the speed control circuit, or both;
   f. removing a portion of the interface from a sealed containment, and
   g. resealing a portion of the fan after the fan is programmed and/or reprogrammed.

2. The method of claim 1, wherein the method includes a step of disconnecting the programming device from the fan before the fan is placed into operation.

3. The method of claim 2, wherein the step of programming includes inputting control of one or more of: speed of the impeller, speed of a blade, alarm failure threshold, temperature versus flow, volume of flow per unit time, safety functions, power saving operations, stand by modes, stand by verses temperature, performance settings, or a combination thereof.

4. The method of claim 3, wherein the instrumentation assembly includes memory, a microprocessor, or both and the interface is in communication with the memory, the microprocessor, or both so that the one or more programs, the one or more signals, or both are directly input in and stored for later use in controlling the fan.

5. The method of claim 4, wherein the method includes a step of inserting a portion of the programming device into a sealed containment.

6. The method of claim 1, wherein the fan is preprogrammed with a predetermined program and the method includes a step of connecting a programming device to the interface and reprogramming a partially rewriteable portion of the memory by inputting settings for one or more of: inputting control of speed of the impeller, speed of a blade, alarm failure threshold, temperature versus flow, volume of flow per unit time, safety functions, power saving operations, stand by modes, stand by versus temperature, or performance settings.

7. The method of claim 1, wherein the printed circuit board has a printed circuit board interface for connecting the interface to the memory, the microprocessor, or both.

8. The method of claim 7, wherein the one or more programs are changed based upon the one or more measured conditions, and the program speed, control method, output signal, or a combination thereof are reconfigured based upon the one or more monitored conditions.

9. The method of claim 8, wherein the instrumentation assembly includes one or more thermistors, one or more temperature sensors, or both that are connected to the printed circuit board and the one or more thermistors, one or more temperature sensors, or both provide feedback, an output signal or both to the microprocessor, the speed control circuit, or both to execute a program based upon feedback received from the one or more thermistors, one or more temperature sensors, or both.

10. The method of claim 9, wherein the memory includes a standard fan speed program and the fan is reprogrammed with a second fan speed program based upon monitored conditions that are stored within the memory.

11. The method of claim 1, wherein the method includes a step of changing the one or more programs based upon the one or more measured conditions, and the program speed, control method, output signal, or a combination thereof are reconfigured based upon the one or more monitored conditions.

12. The method of claim 11, wherein the instrumentation assembly includes one or more thermistors, one or more temperature sensors, or both that are connected to the printed circuit board and the one or more thermistors, one or more temperature sensors, or both, and the method includes a step of providing feedback, an output signal or both to the microprocessor, the speed control circuit, or both to execute a program based upon feedback received from the one or more thermistors, one or more temperature sensors, or both.

13. The method of claim 1, wherein the memory includes a standard fan speed program and the method includes a step of reprogramming the memory with a second fan speed program based upon monitored conditions.

14. The method of claim 1, wherein the includes a step of programming multiple of the fans to work in unison, and the step of programming includes programming the speed control circuit of the multiple fans so that the multiple fans work together to achieve a predetermined condition.

* * * * *